US011530034B2

(12) United States Patent
Morisaki et al.

(10) Patent No.: US 11,530,034 B2
(45) Date of Patent: Dec. 20, 2022

(54) DUCTED FAN AND AIRCRAFT

(71) Applicant: MITSUBISHI HEAVY INDUSTRIES, LTD., Tokyo (JP)

(72) Inventors: Yuki Morisaki, Tokyo (JP); Kazuhiro Imai, Tokyo (JP); Kai Karikomi, Tokyo (JP); Yasuhiro Saiki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 38 days.

(21) Appl. No.: 17/177,678

(22) Filed: Feb. 17, 2021

(65) Prior Publication Data

US 2021/0291973 A1 Sep. 23, 2021

(30) Foreign Application Priority Data

Mar. 23, 2020 (JP) .............................. JP2020-051196

(51) Int. Cl.
*B64C 27/20* (2006.01)
*B64C 29/00* (2006.01)

(52) U.S. Cl.
CPC .............. *B64C 27/20* (2013.01); *B64C 29/00* (2013.01)

(58) Field of Classification Search
CPC ............ B64C 29/0016; B64C 29/0025; B64C 29/0033; B64C 29/00; B64C 27/20; F04D 29/52; F04D 29/522; F04D 29/524; F04D 29/526; F04D 29/528
See application file for complete search history.

(56) References Cited

U.S. PATENT DOCUMENTS

2010/0140416 A1 6/2010 Ohanian, III et al.

FOREIGN PATENT DOCUMENTS

| JP | 2008190460 A | * | 8/2008 | ........... B64C 11/001 |
| WO | WO-2015130384 A2 | * | 9/2015 | ............. F01D 25/02 |

* cited by examiner

*Primary Examiner* — Richard A Edgar
(74) *Attorney, Agent, or Firm* — Wenderoth, Lind & Ponack, L.L.P.

(57) ABSTRACT

A ducted fan includes a fan and a cowl having a cylindrical shape and including an introduction port configured to introduce air from a first end portion side. The fan includes a compressor blade provided on an outer circumferential side and a thrust blade provided on an inner circumferential side of the compressor blade. The cowl includes a housing portion configured to accommodate the compressor blade in an interior thereof, an outlet configured to allow air flowing through the housing portion to be blown therethrough by the compressor blade, and an inlet configured to suck air blown out. The outlet is provided inwards in a radial direction of the cowl and near the introduction port of the cowl, and the inlet is provided inwards in the radial direction of the cowl and between the outlet and the compressor blade in an axial line direction.

16 Claims, 14 Drawing Sheets

DUCTED FAN AND AIRCRAFT

CROSS-REFERENCE TO RELATED APPLICATIONS

This application claims the benefit of priority to Japanese Patent Application Number 2020-051196 filed on Mar. 23, 2020. The entire contents of the above-identified application are hereby incorporated by reference.

TECHNICAL FIELD

The disclosure relates to a ducted fan and an aircraft.

RELATED ART

In recent years, development of the electric aircraft has been actively underway in conjunction with improvements in the performance of power electronics, and one development thereof is a vertical take-off and landing (VTOL) type aircraft.

Electric VTOL aircraft feature different types of airframes depending on requirements such as cruise speed, cruise range, and payload. For example, when a fast cruise speed and a long cruise range are required, a tilt wing aircraft provided with a main wing or a tilt rotor aircraft is often employed.

On the other hand, when the main wing or the rotor is tilted (inclined), stable flight control becomes difficult, and therefore, when the cruise speed is slow and the cruise range is short, a fixed rotor aircraft is often employed.

In recent years, there has been an increase in the need for long distance transport and, in the future, conceivably there will be an increase in the need for a tilt wing aircraft or tilt rotor aircraft based on a dispersion fan that takes advantage of electrification. In this case, in consideration of noise, thrust force during hovering, and the like, it is desirable to employ a ducted fan (a fan with a cowl).

In a ducted fan, separation of air near an opening of the cowl where air is introduced (particularly a lip portion) greatly affects the performance of the thrust force. In particular, separation is likely to occur at the lip portion when air flows obliquely relative to a rotational axis of the fan, such as in a transition mode from takeoff to cruising flight or when there is a crosswind. Therefore, how to suppress separation at the lip portion is an important issue.

US 2010/0140416 A discloses a configuration in which a jet is blown to separate a natural flow from the lip portion, and the separation is controlled by controlling the blowing of the jet.

SUMMARY

Nevertheless, in the configuration US 2010/0140416 A, even when separation at the lip portion can be promoted, separation cannot be proactively suppressed.

In light of the foregoing, an object of the disclosure is to provide a ducted fan and an aircraft capable of drawing air about to be separated to a lip portion to suppress separation of the air at the lip portion.

In order to solve the above-described problem, a ducted fan and aircraft of the disclosure adopt the following means.

That is, a ducted fan according to an aspect of the disclosure includes a fan configured to rotate about an axial line to generate a flow of air, and a cowl having a cylindrical shape extending in an axial line direction and surrounding the fan about the axial line, and including an introduction port configured to introduce air from a first end portion side by rotation of the fan. The fan includes a compressor blade provided on an outer circumferential side and a thrust blade provided on an inner circumferential side of the compressor blade. The cowl includes a housing portion configured to accommodate the compressor blade in an interior thereof, an outlet configured to allow air flowing through the housing portion to be blown therethrough by the compressor blade, and an inlet configured to suck air blown out from the outlet. The outlet is provided inwards in a radial direction of the cowl and near the introduction port of the cowl, and the inlet is provided inwards in the radial direction of the cowl and between the outlet and the compressor blade in the axial line direction.

Further, an aircraft according to an aspect of the disclosure includes the above-described ducted fan.

According to a ducted fan and an aircraft according to the disclosure, it is possible to draw air about to be separated to a lip portion to suppress separation of the air at the lip portion.

BRIEF DESCRIPTION OF DRAWINGS

The disclosure will be described with reference to the accompanying drawings, wherein like numbers reference like elements.

DESCRIPTION OF EMBODIMENTS

First Embodiment

Hereinafter, a ducted fan and an aircraft according to a first embodiment of the disclosure will be described with reference to the drawings.

Outline of Configuration of Ducted Fan

Figure 1:
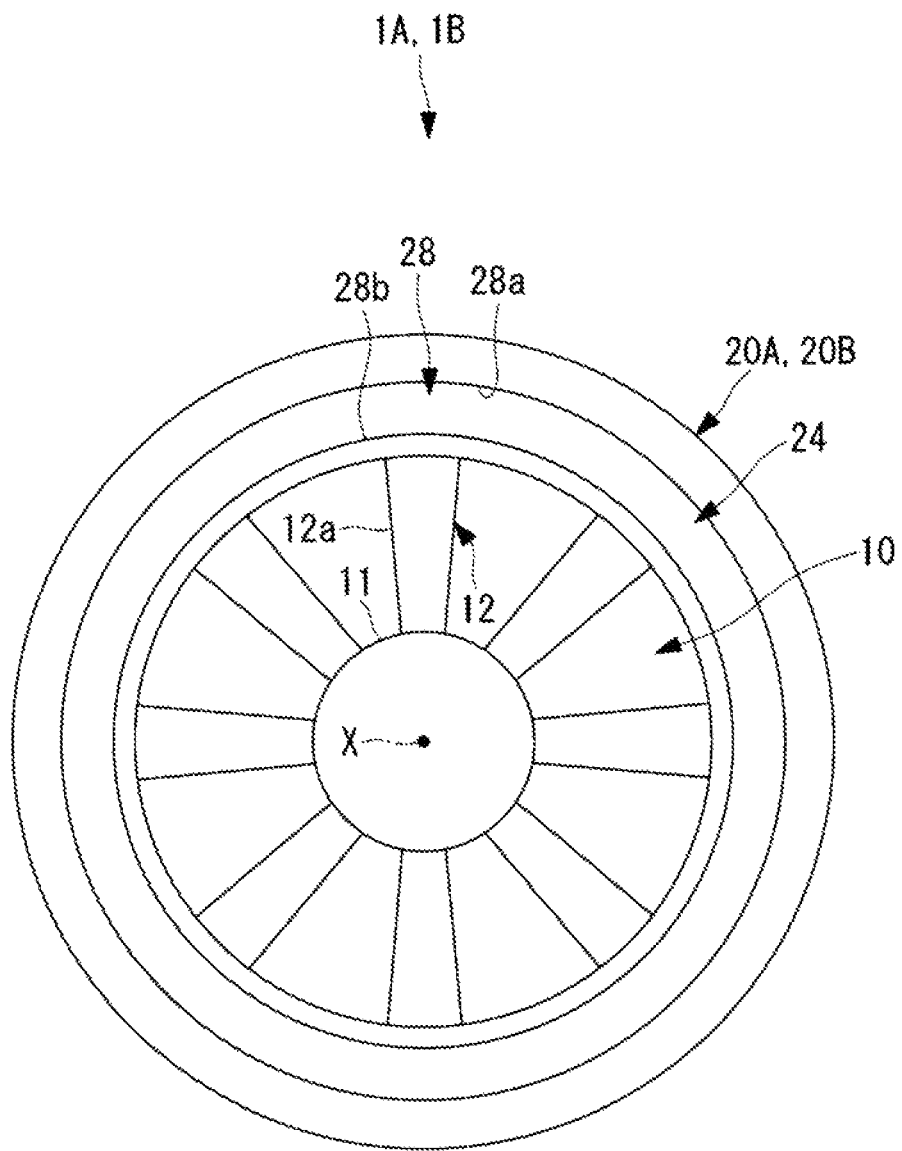
FIG. 1 is a plan view of a ducted fan according to first and second embodiments of the disclosure.
Figure 2:
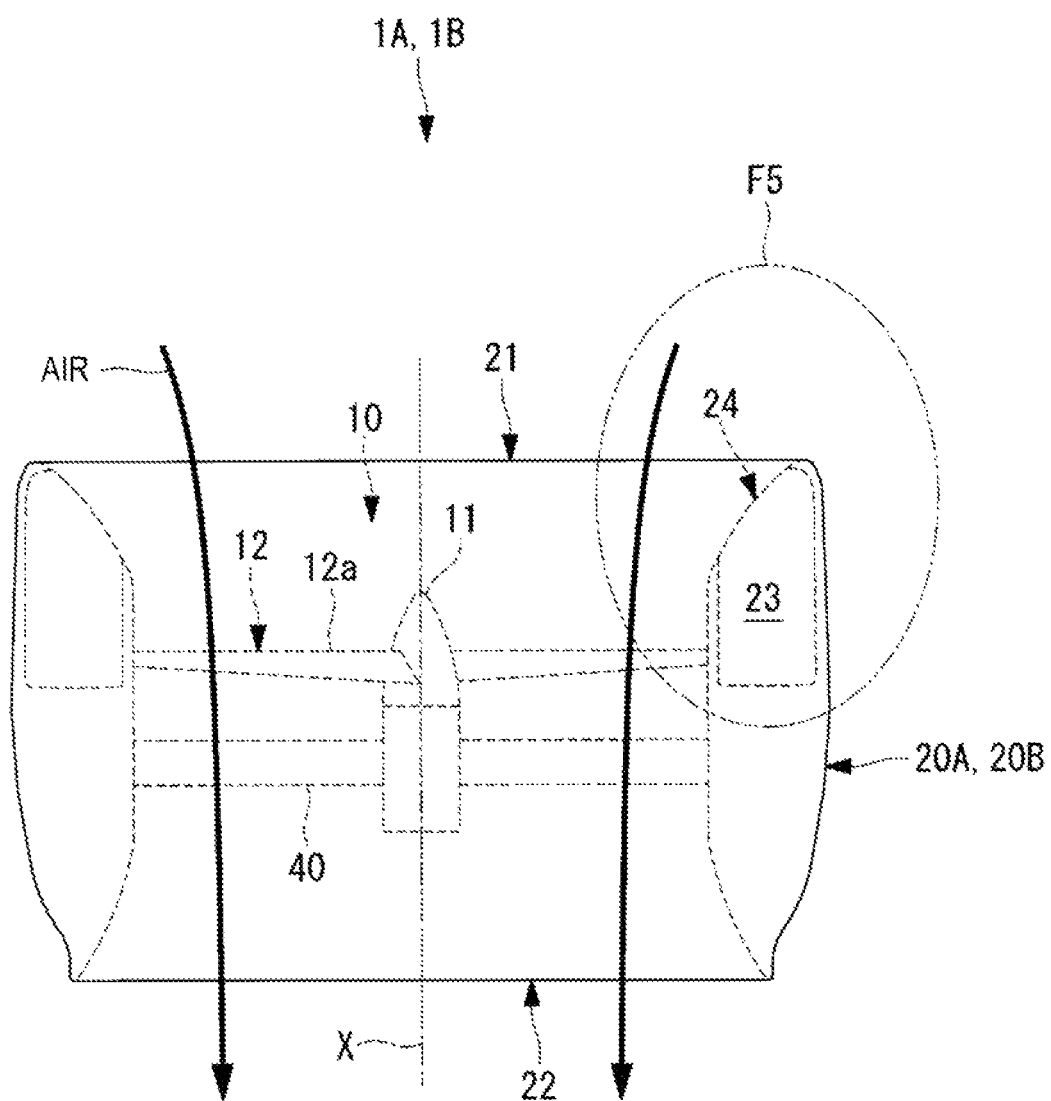
FIG. 2 is a side view of the ducted fan according to the first and second embodiments of the disclosure.

FIG. 1 is a plan view of a ducted fan 1A. FIG. 2 is a side view of the ducted fan 1A.

As illustrated in FIG. 1 and FIG. 2, the ducted fan 1A includes a fan 10 and a cowl 20 having a cylindrical shape surrounding the fan 10.

Figure 14:
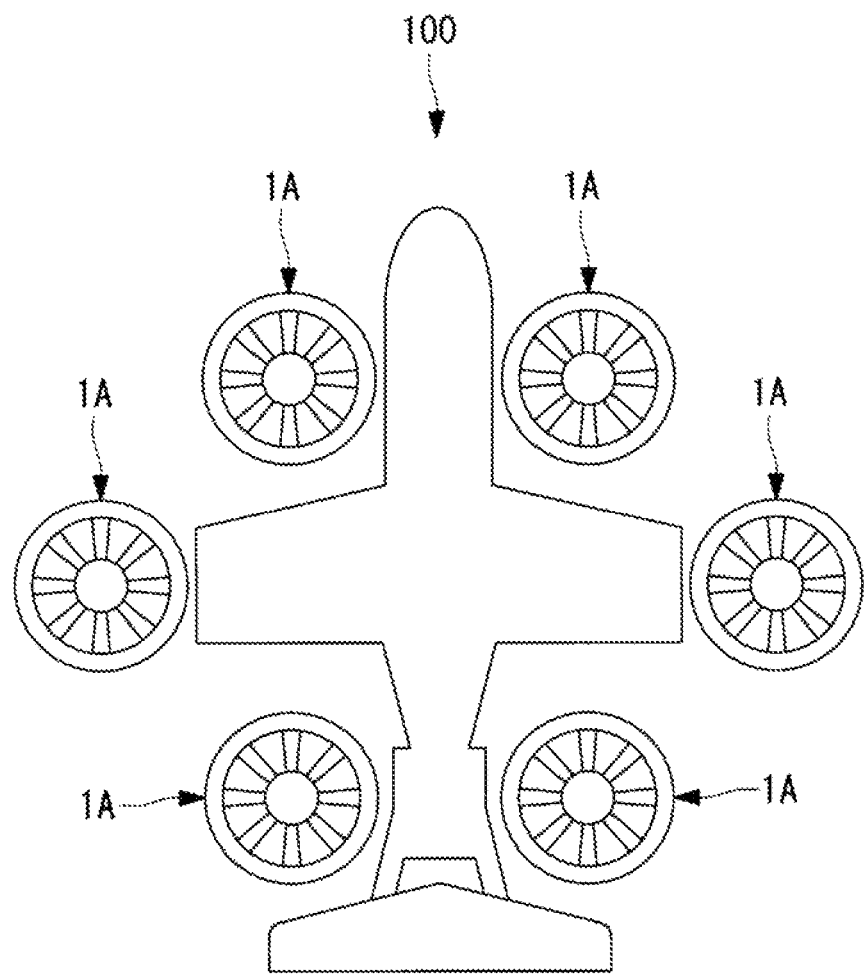
FIG. 14 is a plan view of an aircraft including the ducted fan.

The ducted fan 1A, as illustrated in FIG. 14, is a device that is attached to an aircraft 100, such as a tilt rotor aircraft or a tilt wing aircraft, for example, and generates a thrust force required for flight of (thrust force for flying and driving) the aircraft 100.

Note that the ducted fan 1A of FIG. 14 is illustrated away from a main wing, a fuselage, and the like for ease of understanding, but is in fact fixed to a main body of the aircraft 100, such as the main wing or the fuselage.

The fan 10 includes a hub 11 having an axial line X as a rotational axis, and a plurality of blades 12 attached to the hub 11.

A cowl 20A is a member having a cylindrical shape and extending in the axial line X direction, and accommodates the fan 10 on an inner side, surrounding an entire circumferential direction of the fan 10. Hereinafter, when the term "inner side" or "outer side" is simply used, the term means "inner side in a radial direction" or "outer side in a radial direction" about the axial line X.

As illustrated in FIG. 2, a support member 40 is connected to an inner circumferential surface (circumferential surface on an inner side) of the cowl 20A, and rotatably supports the hub 11 about the axial line X. The fan 10 supported by the support member 40 is rotated about the axial line X by a drive device described later.

With the rotation of the fan 10 (strictly speaking, the blades 12), the surrounding air is introduced from an introduction port 21 on a first end portion side of the cowl 20A and discharged from a discharge port 22 on a second end portion side through the inside of the cowl 20A. That is, a flow of air occurs from the introduction port 21 toward the discharge port 22.

Detailed Configuration of Fan

Figure 3:
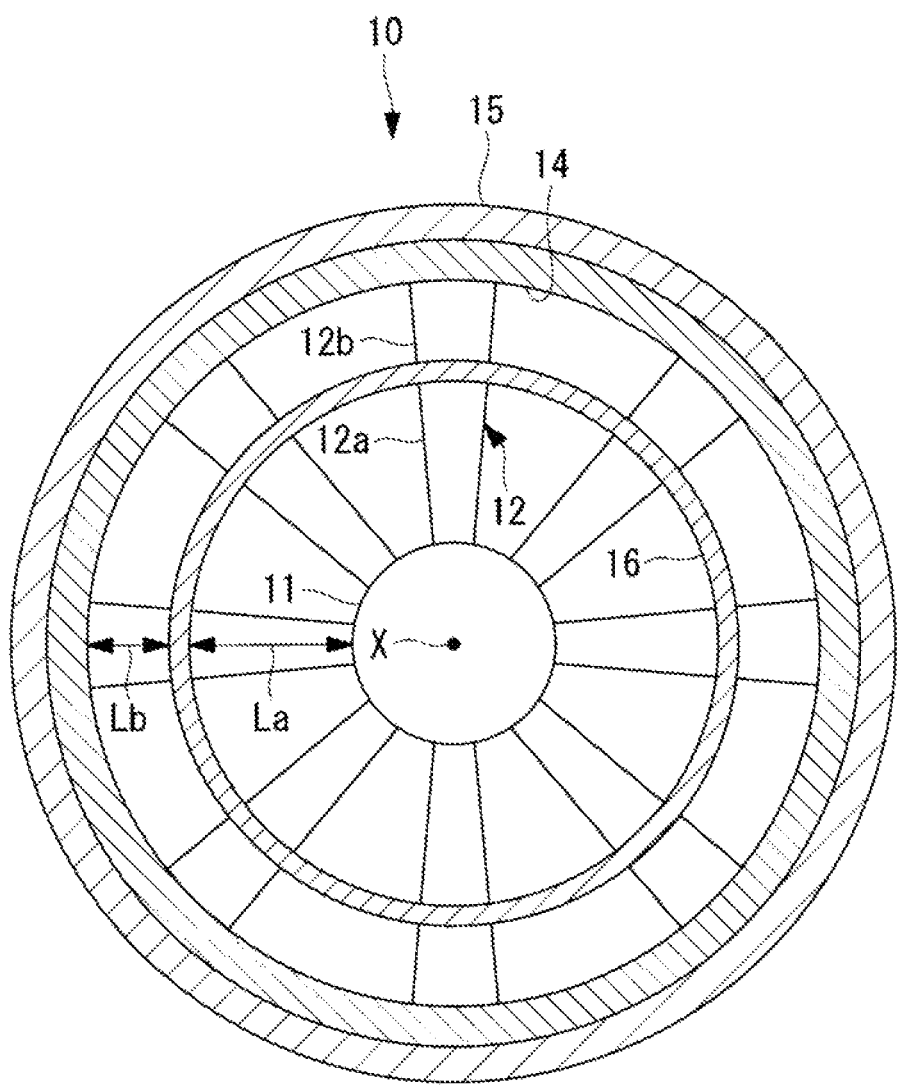
FIG. 3 is a plan view of a fan.
Figure 4:
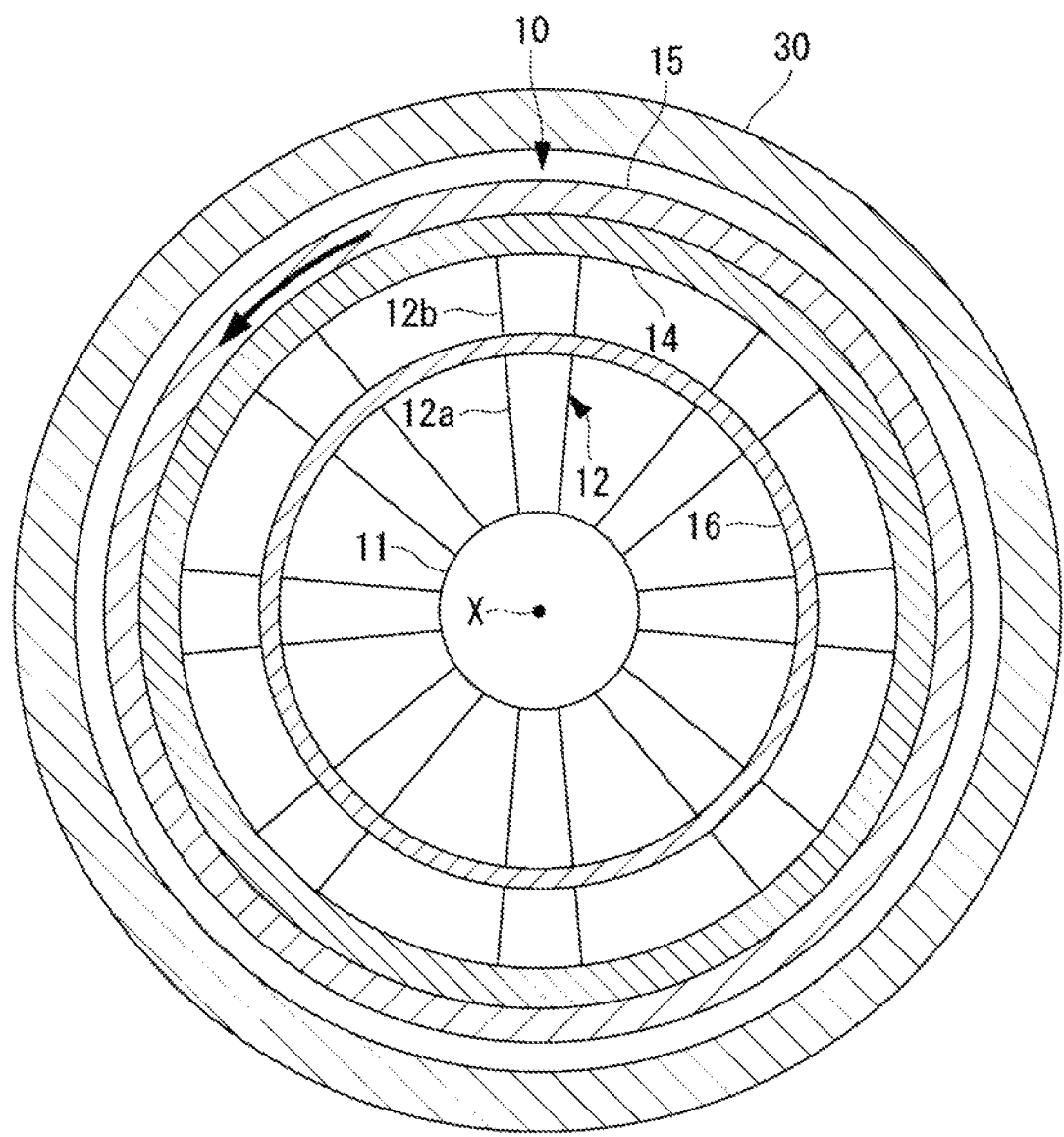
FIG. 4 is a plan view of the fan and a stator core.

FIG. 3 is a drawing of only the fan 10 in plan view. FIG. 4 is a drawing of the fan 10 and a stator core 30 in plan view.

As illustrated in FIG. 3, the blade 12 is constituted by two types of blades, namely a thrust blade 12a and a compressor blade 12b on an outer circumferential side thereof.

Given La as a length of the thrust blade 12a in the radial direction and Lb as a length of the compressor blade 12b in the radial direction, preferably La>Lb.

The thrust blade 12a is a blade for generating an airflow mainly inside the cowl 20A, and a blade surface thereof is exposed to the inside of the cowl 20A in plan view (refer to FIG. 1).

On the other hand, the compressor blade 12b is a blade for generating airflow in a housing portion 23 formed mainly inside the cowl 20A (refer to FIG. 2), and is accommodated in the housing portion 23. Therefore, in plan view (refer to FIG. 1), a blade surface thereof is not visible.

Note that the housing portion 23 in FIG. 2 is a space for accommodating members such as the compressor blade 12b, but in this drawing, the description of the members accommodated inside the housing portion 23 is omitted for simplicity.

The thrust blade 12a and the compressor blade 12b are connected by a connecting rim (rim) 16 formed into an annular shape about the axial line X. As a result, the thrust blade 12a and the compressor blade 12b are configured to integrally rotate together as the blade 12.

A rotor core 14 formed into an annular shape about the axial line X is attached to a blade tip on the outer circumferential side of the compressor blade 12b. Further, a magnet 15 is attached to an outer circumferential surface of the rotor core 14.

As illustrated in FIG. 4, the stator core 30 having a circular shape and disposed with a predetermined gap between itself and an outer circumferential surface of the magnet 15 is provided on an outer circumferential side of the magnet 15. The stator core 30 is accommodated in and fixed to the housing portion 23 of the cowl 20A.

A plurality of wound coils (not illustrated) are attached to the stator core 30, and magnetic poles thereof are changed by a power supply device (not illustrated). That is, an electric motor (drive device) is configured between the wound coils and the magnet 15 attached to the compressor blade 12b. In other words, the fan 10 is a rim drive type that obtains a driving force from the outer circumferential side.

Detailed Configuration of Cowl

Figure 5:
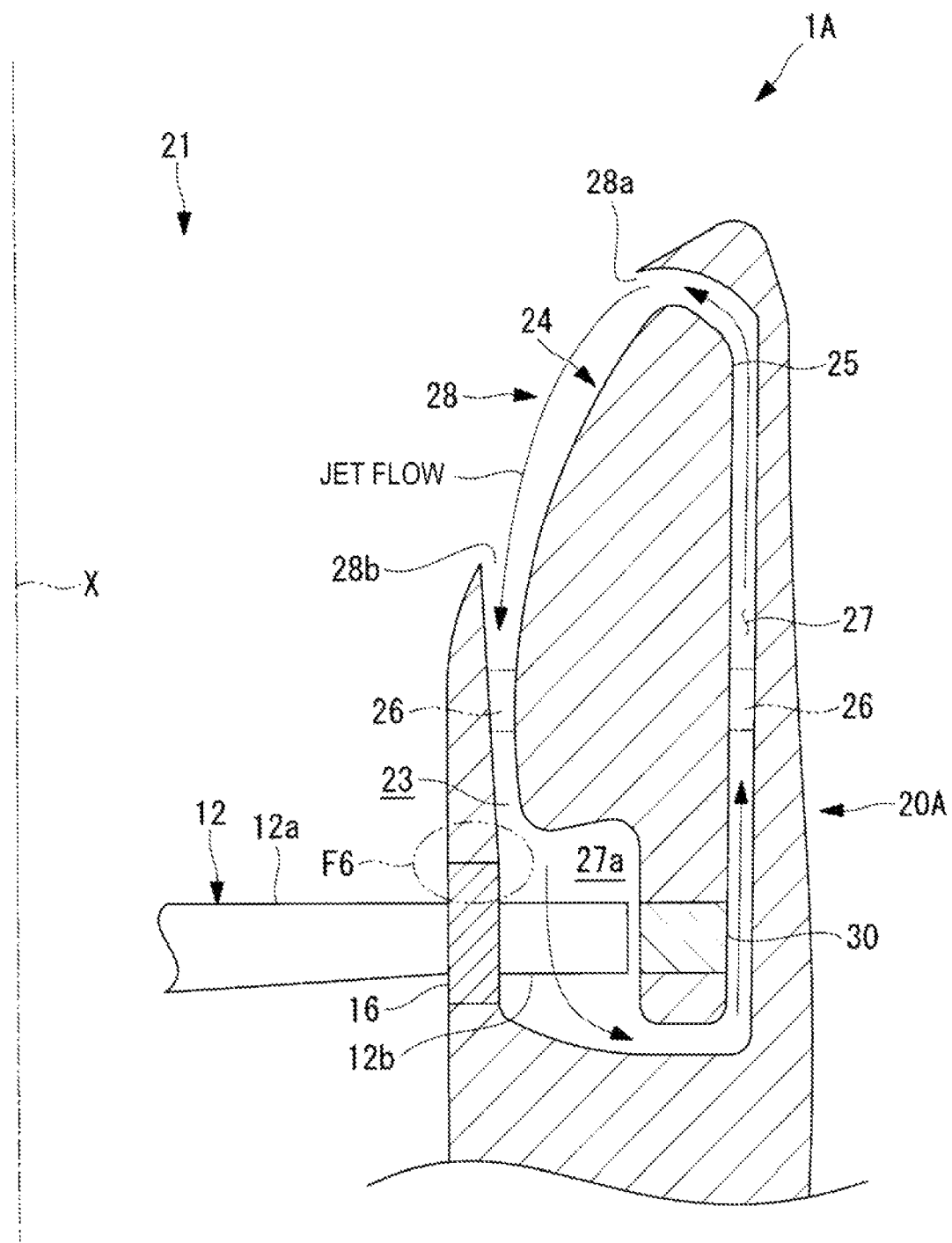
FIG. 5 is a partially enlarged view (vertical cross-sectional view) of an F5 portion illustrated in FIG. 2 (first embodiment).
Figure 6:
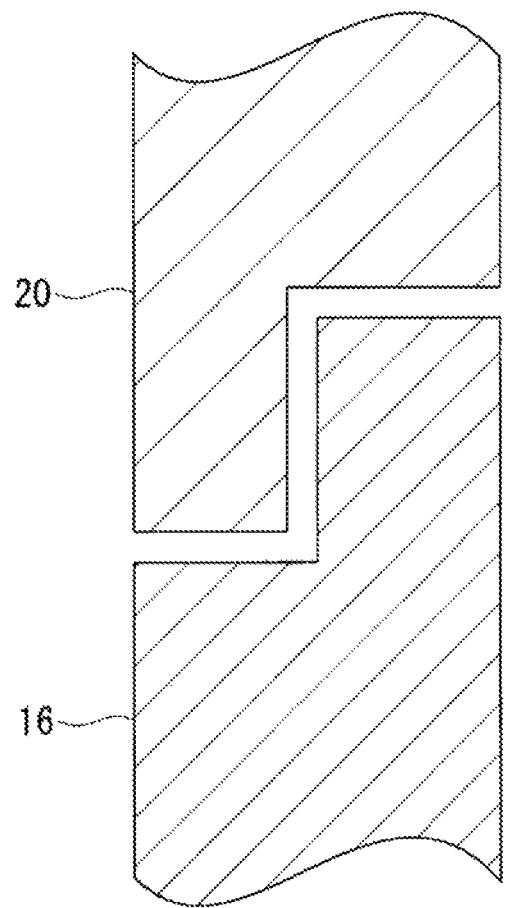
FIG. 6 is a partially enlarged view of an F6 portion illustrated in FIG. 5.
Figure 7:
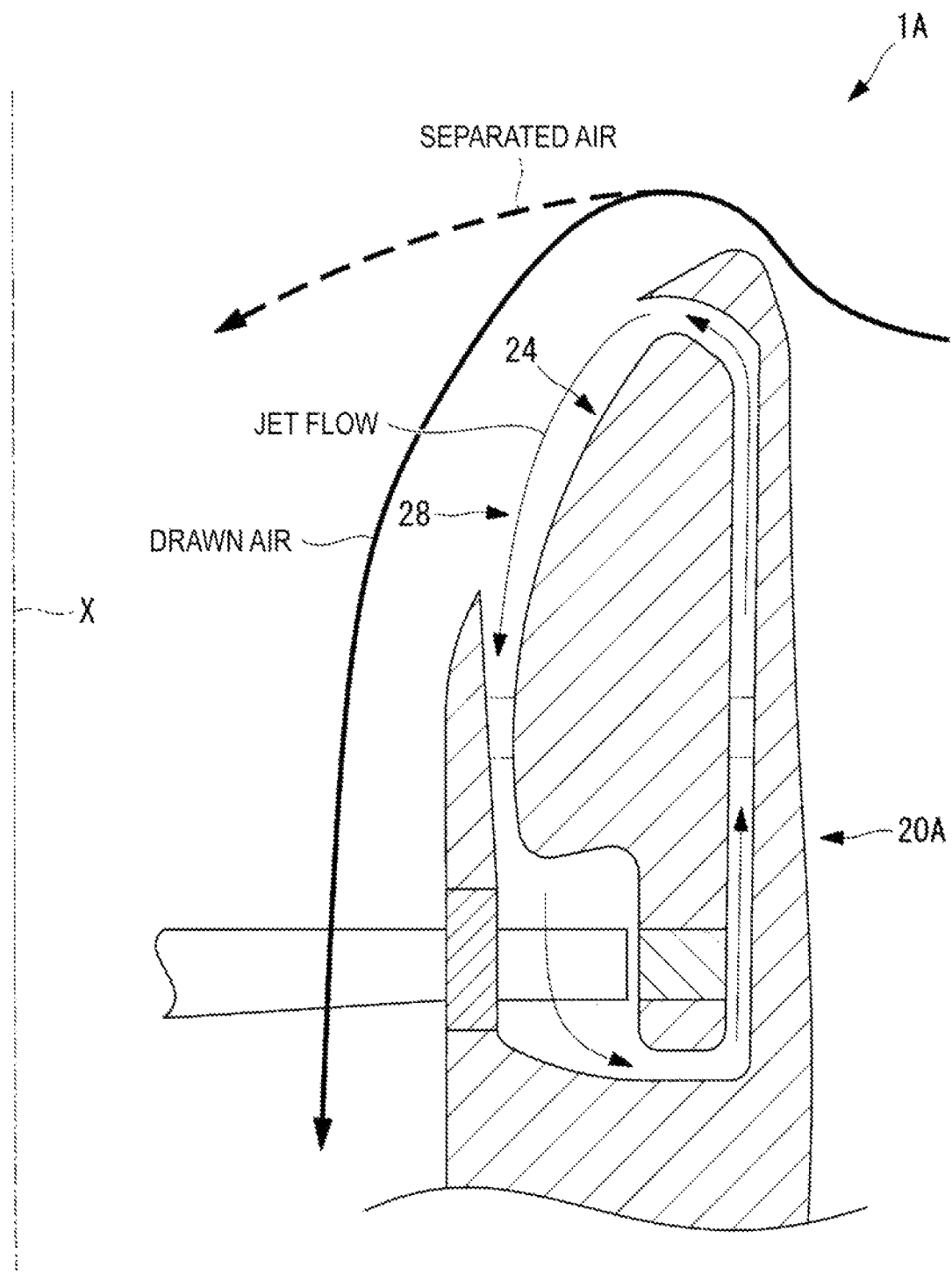
FIG. 7 is a drawing illustrating a flow of air near a lip portion illustrated in FIG. 5.
Figure 8:
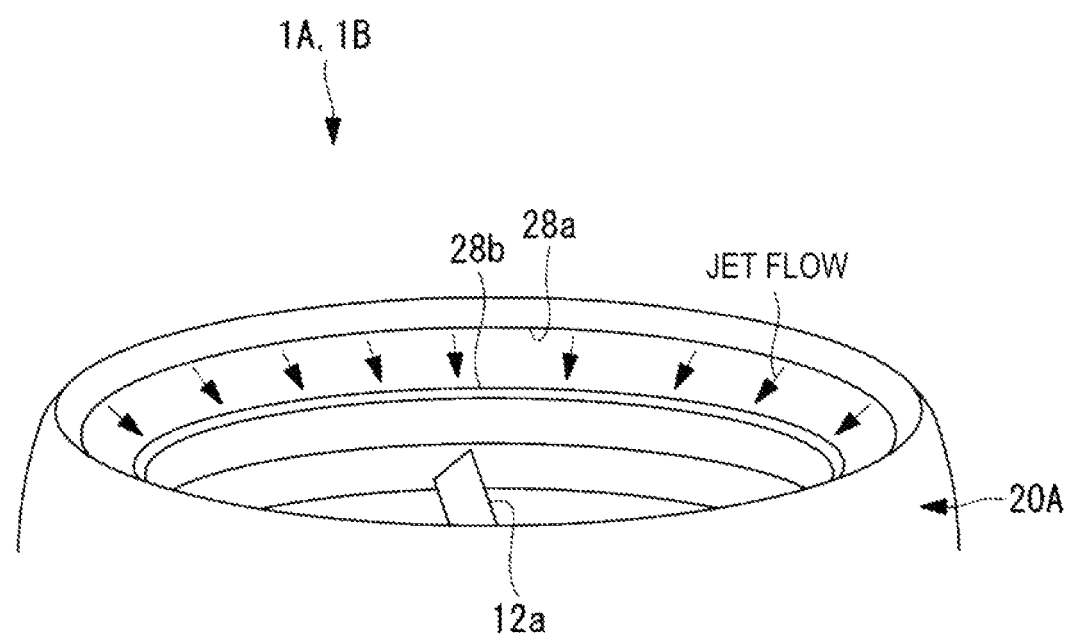
FIG. 8 is a perspective view, from an introduction port side, of a cowl according to the first embodiment.

FIG. 5 is a partially enlarged view (vertical cross-sectional view) of an F5 portion illustrated in FIG. 2. FIG. 6 is a partially enlarged view of an F6 portion illustrated in FIG. 5. FIG. 7 is a drawing illustrating a flow of air near a lip portion 24 illustrated in FIG. 5. FIG. 8 is a perspective view, from the introduction port 21 side, of the cowl 20A.

As illustrated in FIG. 5, the connecting rim 16 that connects the compressor blade 12b and the thrust blade 12a constitutes a wall unit partitioning the housing portion 23 and a space inside the cowl 20A (the space in which the thrust blade 12a is present). At this time, an inner circumferential surface of the cowl 20A and an inner circumferential surface of the connecting rim 16 are connected, forming a smooth surface. That is, the inner circumferential surface of the connecting rim 16 functions as a portion of the inner circumferential surface of the cowl 20A. This makes it possible to reduce resistance to air flowing inside the cowl 20A (particularly air flowing along the inner circumferential surface of the cowl 20A).

Note that the connecting rim 16 rotates about the axial line X together with the thrust blade 12a and the compressor blade 12b, and thus a slight gap may be provided between the connecting rim 16 and the cowl 20A in the axial line X direction. This makes it possible to smoothly rotate the connecting rim 16 with respect to the cowl 20A.

Further, as illustrated in FIG. 6, the gap may be bent to act as a labyrinth seal. This makes it possible to suppress leakage of air from the housing portion 23 through the gap between the connecting rim 16 and the cowl 20A.

As illustrated in FIG. 5, the housing portion 23 is a bottomed space formed from the inner circumferential surface (so-called lip portion) near the introduction port 21 of the cowl 20A toward the discharge port 22 side (lower side in the drawing).

The housing portion 23 accommodates the compressor blade 12b of the fan 10, an internal structure 25, and the stator core 30 attached to the internal structure 25.

The internal structure 25 is connected to an inner wall of the housing portion 23 via a support column 26. A plurality of the support columns 26 are provided in the circumferential direction of the axial line X. However, the support columns 26 are provided separated from each other in the circumferential direction so as not to inhibit air flowing through an internal flow path 27.

An upper side surface of the internal structure 25, which is exposed from the cowl 20A at an upper portion of the housing portion 23, forms a flow line shape that runs substantially parallel to the original lip portion.

As used herein, the term "original lip portion" refers to a lip portion of the cowl 20A in a case in which the housing portion 23 is not formed.

In the present embodiment, a portion of the inner circumferential surface of the cowl 20A on and near the upper side surface of the internal structure 25 forming the flow line shape is referred to as the lip portion 24 of the cowl 20A.

A recess 27a for receiving the compressor blade 12b, the rotor core 14, and the magnet 15 is formed on an inner circumferential side of a lower portion of the internal structure 25. Further, the stator core 30 is integrated with and fixed to the internal structure 25 facing the blade tip of the compressor blade 12b.

Note that the descriptions of the rotor core 14 and the magnet 15 are omitted in this drawing for the sake of simplicity.

The internal structure 25 defines an internal flow path 27 that is substantially U-shaped with the inner wall of the housing portion 23. The recess 27a is a portion of the internal flow path 27. The compressor blade 12b rotates at the recess 27a, thereby compressing air on a blade lower surface side, and causing air on a blade upper surface side to be sucked to the blade lower surface side and generate a flow of air in the internal flow path 27.

The internal flow path 27 includes an opening (outlet 28a) near the lip portion 24 on the introduction portion 21 side. Further, the internal flow path 27 includes an opening (inlet 28b) near a lower portion of the lip portion 24, between the outlet 28a and the compressor blade 12b in the axial line X direction. The outlet 28a and the inlet 28b are formed by the upper side surface (portion corresponding to the lip portion 24) of the internal structure 25 and the cowl 20A.

The portion of the cowl 20A corresponding to the lip portion 24 is open by the housing portion 23, and thus the internal flow path 27 is not structurally defined in a section of the portion corresponding to the lip portion 24 (section from the outlet 28a to the inlet 28b, not via the compressor blade 12b). Nevertheless, compressed air is blown from the outlet 28a at high speed by the compressor blade 12b and that air is sucked from the inlet 28b, thereby generating a fast flow of air (hereinafter referred to as "jet flow") along the upper side surface (surface including the lip portion 24) of the flow line shape of the internal structure 25 and forming an inner jet flow path 28 that is a virtual flow path.

As illustrated in FIG. 7, the jet flow in the inner jet flow path 28 draws the surrounding air by a Coanda effect, thereby making it possible to draw, for example, the air flowing from a side surface of the cowl 20A and about to be separated at the lip portion 24 to the lip portion 24.

The outlet 28a and the inlet 28b configured as described above are formed around an entire circumference (360°) of the cowl 20A about the axial line X, as illustrated in FIG. 1 and FIG. 8. This makes it possible to provide the ducted fan 1A that can handle air flowing in from all directions.

Note that the higher the jet flow, the easier it is to obtain the Coanda effect, and thus preferably the compressor blade 12b has a blade shape different from that of the thrust blade 12a, for example, a blade shape specialized for air compression.

Figure 9:
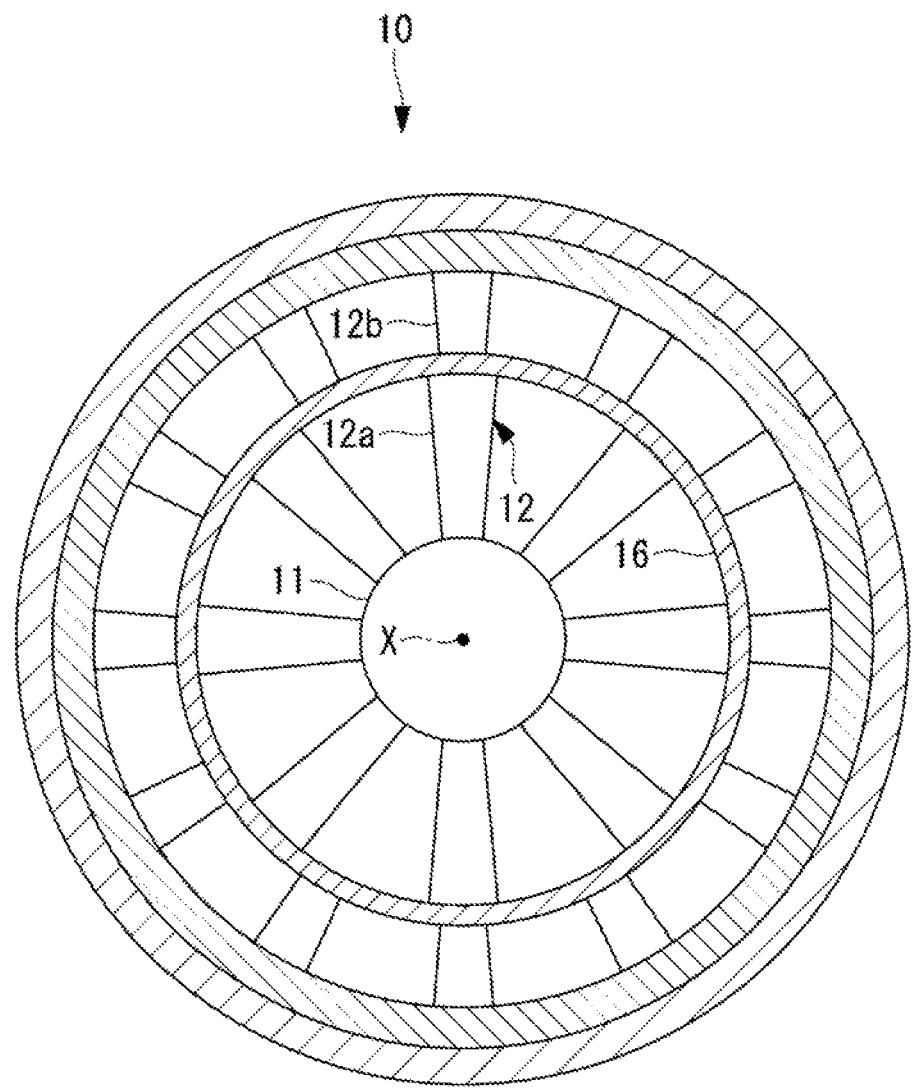
FIG. 9 is a plan view of a fan in which the number of compressor blades and the number of thrust blades differ from each other.

Further, as illustrated in FIG. 9, the number of compressor blades 12b may differ from the number of thrust blades 12a, thereby achieving more specialized air compression.

According to the present embodiment, the following effects are obtained.

The ducted fan 1A includes, on the lip portion 24 of the cowl 20A, the outlet 28a configured to blow out the air flowing through the housing portion 23 by the compressor blade 12b and an inlet 28b configured to suck the air blown out from the outlet 28a, thereby making it possible to generate a jet flow along the lip portion 24 by the compressor blade 12b. This jet flow draws the surrounding air by the Coanda effect, thereby making it possible to draw the air about to be separated at the lip portion 24 to the lip portion 24. As a result, separation of the air at the lip portion 24 can be suppressed. This is useful when air flows obliquely relative to the axial line X, such as when the ducted fan 1A is inclined or when there is a crosswind. Further, even when air flows along the axial line X, such as during takeoff or during cruising flight in which the ducted fan 1A is not inclined relative to the flow of air, the flow of air along the lip portion 24 is increased in speed by the jet flow, thereby making it possible to reduce the pressure that becomes a resistance component.

Further, the connecting rim 16 forms a portion of the inner circumferential surface of the cowl 20A, thereby making it possible to partition the housing portion 23 of the cowl 20A where the compressor blade 12b is present and the space inside the cowl 20A where the thrust blade 12a is present by the connecting rim 16. Thus, the flow of air generated by the compressor blade 12b and the flow of air generated by the thrust blade 12a can be separated.

Further, the outlet 28a and the inlet 28b are formed around the entire circumference of the cowl 20A, thereby making it possible to provide the ducted fan 1A that can handle crosswinds from any direction, for example.

Further, the ducted fan 1A is a rim drive type including the rotor core 14 provided with the magnet 15 on the outer circumferential side of the compressor blade 12b and the stator core 30 provided with a coil in the housing portion 23, thereby making it possible to cool the stator core 30, which is a heat generating component, by the flow of air generated by the compressor blade 12b.

Modified Examples

Figure 10:
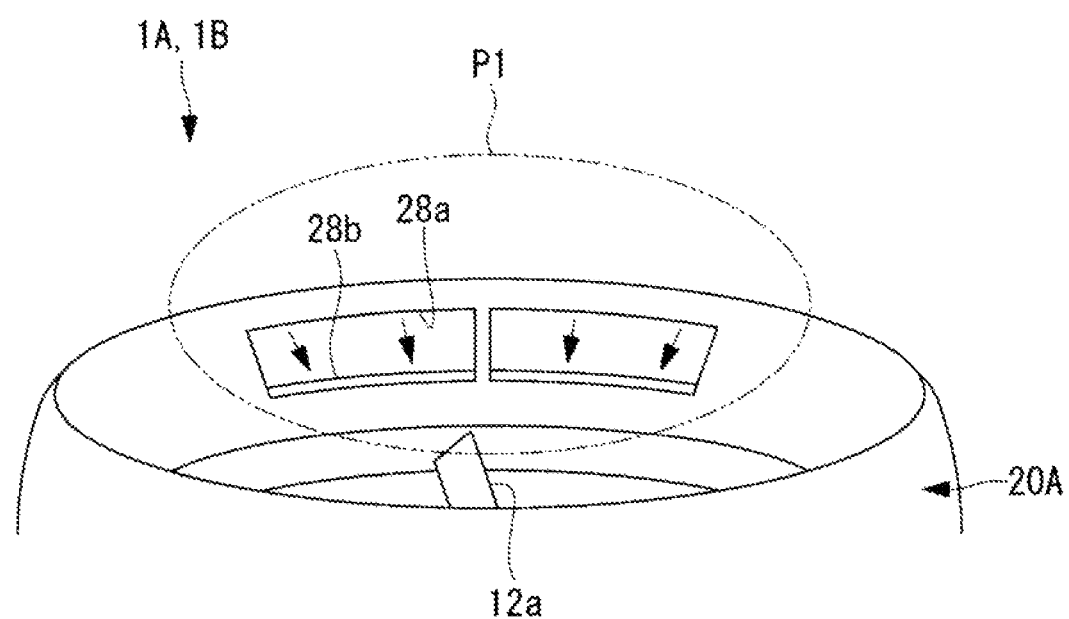
FIG. 10 is a perspective view, from the introduction port side, of a cowl according to a modified example of the first embodiment.

While, in the first embodiment, the outlet 28a and the inlet 28b are formed around the entire circumference of the cowl 20A about the axial line X, the outlet 28a and the inlet 28b may be formed only in a portion of the cowl 20A in the circumferential direction, as illustrated in FIG. 10. This makes it possible to reduce manufacturing costs compared to a case in which the outlet 28a and the inlet 28b are formed around the entire circumference of the cowl 20A.

Figure 11:
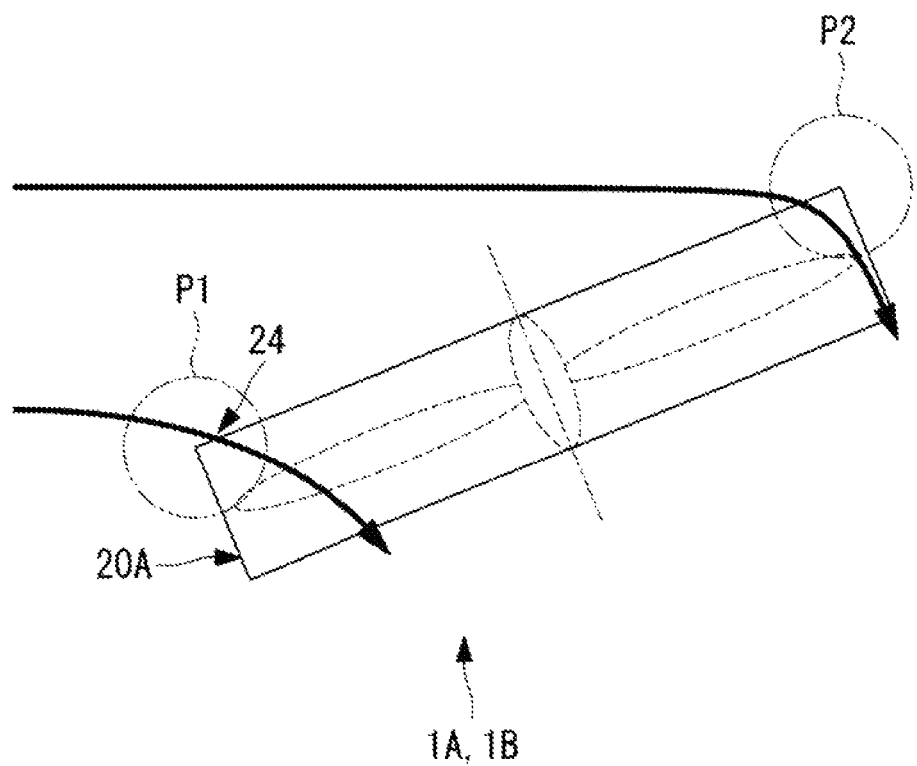
FIG. 11 is a side view of an inclined ducted fan.

A portion in the circumferential direction refers to, for example, as illustrated in FIG. 11, a portion positioned upwind when the ducted fan 1A is inclined (portion indicated by P1 in the drawing).

In an aircraft, such as a tilt rotor aircraft or a tilt wing aircraft, in which the ducted fan 1A is provided, the ducted fan 1A is inclined (tilted) during a transition mode from takeoff to cruising flight. At this time, the air flowing into the portion indicated by P1 in the drawing (flow of air associated with the flight of the aircraft) flows in a direction (right side in the drawing) away from the portion indicated by P1. Therefore, separation is likely to occur at the lip portion 24 upwind of the cowl 20A. On the other hand, a portion positioned downwind of the cowl 20A (portion indicated by P2 in the drawing) is inclined in a direction of receiving the wind, and thus separation is less likely to occur compared to the upwind portion indicated by P1.

For the reasons described above, the outlet 28a and the inlet 28b may be provided only on a portion of the cowl 20A positioned upwind when the ducted fan 1A is inclined.

Second Embodiment

Hereinafter, a ducted fan according to a second embodiment of the disclosure will be described with reference to the drawings.

A ducted fan 1B of the present embodiment differs from the ducted fan 1A of the first embodiment in that a second outlet 29a is provided. Therefore, the same components are denoted by the same reference numerals and the description thereof will be omitted.

Figure 12:
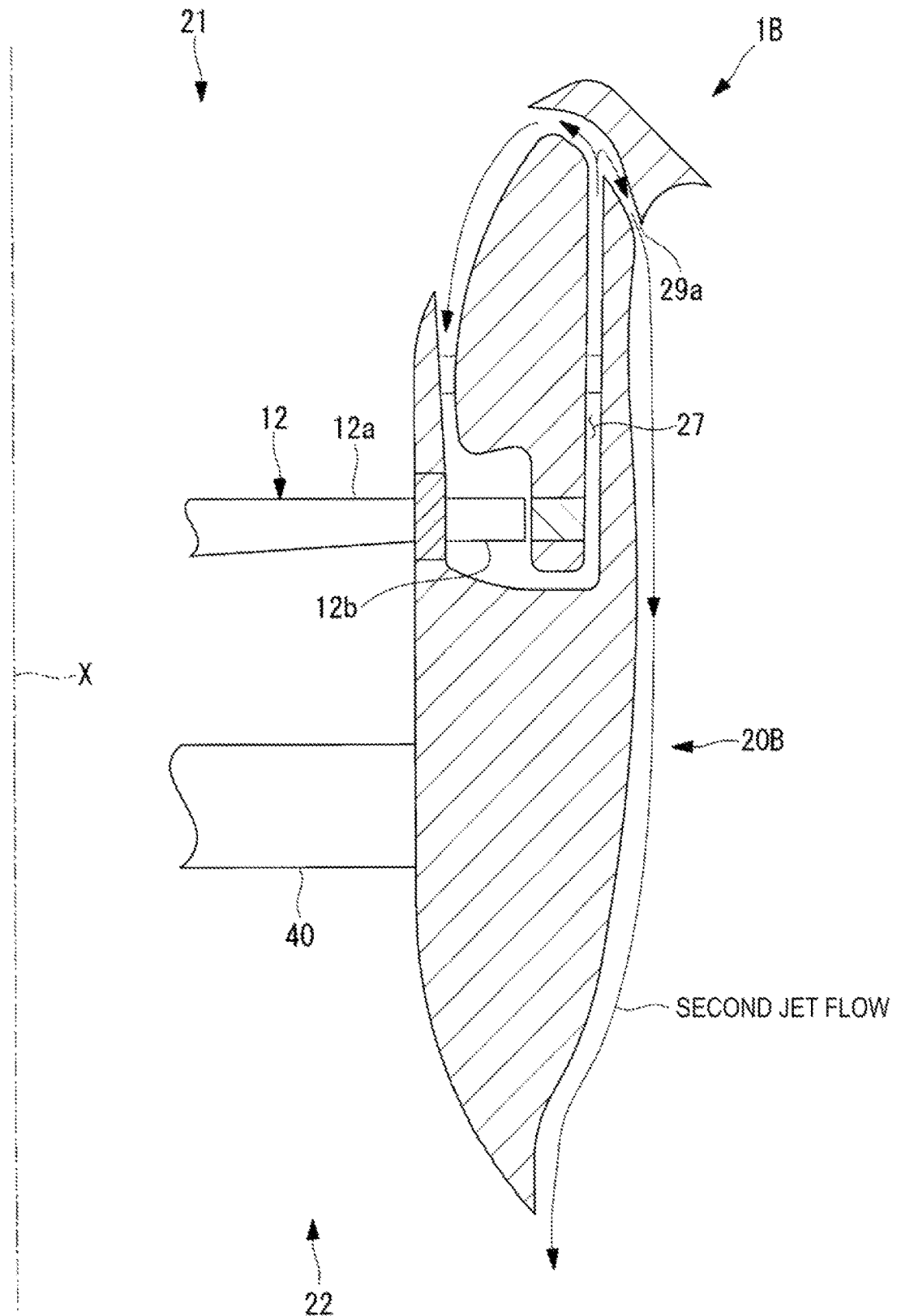
FIG. 12 is a partially enlarged view (vertical cross-sectional view) of the F5 portion illustrated in FIG. 2 (second embodiment).
Figure 13:
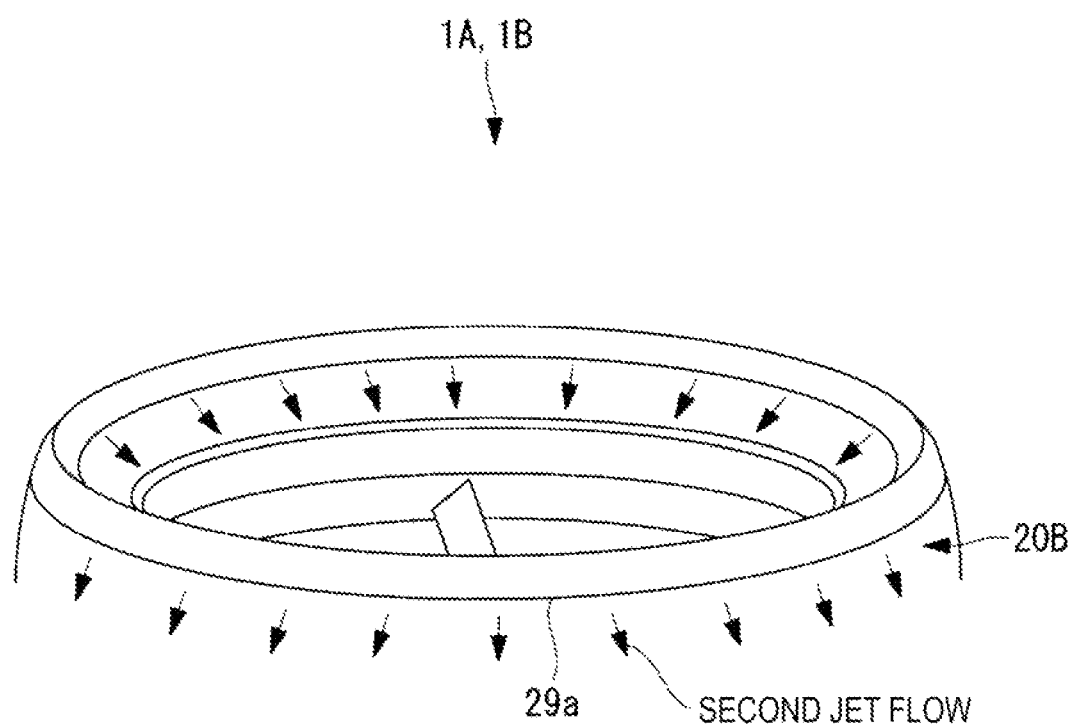
FIG. 13 is a perspective view, from the introduction port side, of a cowl according to the second embodiment.

FIG. 12 is a partially enlarged view (vertical cross-sectional view) of the F5 portion illustrated in FIG. 2. FIG. 13 is a perspective view from the introduction port 21 side of a cowl 20B.

As illustrated in FIG. 12, the internal flow path 27 branches toward an outer circumferential surface (circumferential surface on an outer side) of the cowl 20B on the introduction port 21 side of the cowl 20B. The branched internal flow path 27 includes an opening (second outlet 29a) that communicates with the outer circumferential surface of the cowl 20B. The second outlet 29a opens toward the discharge port 22 side.

Air compressed by the compressor blade 12b is blown from the second outlet 29a at high speed (refer to FIG. 13). The air forms a fast flow of air (hereinafter, referred to as "second jet flow") along the outer circumferential surface of the cowl 20B in a direction from the introduction port 21 side of the cowl 20B toward the discharge port 22 side.

According to the present embodiment, the following effects are obtained.

The second jet flow by the second outlet 29a can be generated by the compressor blade 12b. The second jet flow draws the surrounding air by the Coanda effect, making it possible to suppress the separation of air at the outer circumferential surface of the cowl 20B. Further, the flow of air along the outer circumferential surface of the cowl 20B is increased in speed by the second jet flow, making it possible to reduce the pressure that becomes a resistance component.

Note that, while the ducted fans 1A, 1B of a rim drive type are employed in the first embodiment and the second embodiment, an electric motor may be incorporated into the support member 40 illustrated in FIG. 2 to rotate the hub 11 about the axial line X, for example.

The first and second embodiments of the disclosure described above are understood as follows, for example.

That is, a ducted fan (1A, 1B) according to an aspect of the disclosure includes a fan (10) configured to rotate about an axial line (X) to generate a flow of air, and a cowl (20A, 20B) having a cylindrical shape extending in an axial line (X) direction and surrounding the fan (10) about the axial line (X), and including an introduction port (21) configured to introduce air from a first end portion side by rotation of the fan (10), the fan (10) including a compressor blade (12b) provided on an outer circumferential side and a thrust blade (12a) provided on an inner circumferential side of the compressor blade (12b), the cowl (20A, 20B) including a housing portion (23) configured to accommodate the compressor blade (12b) in an interior thereof, an outlet (28a) configured to allow air flowing through the housing portion (23) to be blown therethrough by the compressor blade (12b), and an inlet (28b) configured to suck air blown out from the outlet (28a), the outlet (28a) being provided inwards in a radial direction of the cowl (20A, 20B) and near the introduction port (21) of the cowl (20A, 20B), and the inlet (28b) being provided inwards in the radial direction of the cowl (20A, 20B) and between the outlet (28a) and the compressor blade (12b) in the axial line (X) direction.

The ducted fan (1A, 1B) according to the present aspect includes the fan (10) configured to rotate about the axial line (X) to generate a flow of air, and the cowl (20A, 20B) having a cylindrical shape extending in the axial line (X) direction and surrounding the fan (10) about the axial line (X), and including the introduction port (21) configured to introduce air from the first end portion side by rotation of the fan (10), the fan (10) including the compressor blade (12b) provided on the outer circumferential side and the thrust blade (12a) provided on the inner circumferential side of the compressor blade (12b), the cowl (20A, 20B) including the housing portion (23) configured to accommodate the compressor blade (12b) in the interior thereof, the outlet (28a) configured to allow air flowing through the housing portion (23) to be blown therethrough by the compressor blade (12b), and the inlet (28b) configured to suck air blown out from the outlet (28a), the outlet (28a) being provided inwards in the radial direction of the cowl (20A, 20B) and near the introduction port (21) of the cowl (20A, 20B), and the inlet (28b) being provided inwards in the radial direction of the cowl (20A, 20B) and between the outlet (28a) and the compressor blade (12b) in the axial line (X) direction, thereby making it possible to generate a flow of air (hereinafter referred to as "jet flow") along the inner circumferential surface (the surface including the so-called "lip portion") near the introduction port (21) of the cowl (20A, 20B) by the compressor blade (12b) integrated with the thrust blade (12a). This jet flow draws the surrounding air by a Coanda effect, thereby making it possible to draw the air about to be separated at the lip portion to the lip portion. As a result, separation of the air at the lip portion can be suppressed. This is useful when air flows obliquely relative to the axial line (X), such as when the ducted fan (1A, 1B) is inclined or when there is a crosswind.

Further, even when air flows along the axial line (X), such as during takeoff or during cruising flight in which the ducted fan (1A, 1B) is not inclined relative to the flow of air, the flow of air along the lip portion is increased in speed by the jet flow, thereby making it possible to reduce the pressure acting as a resistance component.

Note that an electric motor is suitably used as the drive of the fan (10).

Further, in the ducted fan (1A, 1B) according to an aspect of the disclosure, the compressor blade (12b) and the thrust blade (12a) are connected by a rim (16) that is annular about the axial line (X) and is configured to rotate along with the fan (10), and the rim (16) forms a portion of a surface of the cowl (20A, 20B) inwards in the radial direction.

In the ducted fan (1A, 1B) according to the present aspect, the compressor blade (12b) and the thrust blade (12a) are connected by the rim (16) that is annular about the axial line (X) and is configured to rotate along with the fan (10), and the rim (16) forms a portion of the surface of the cowl (20A, 20B) inwards in the radial direction, thereby making it possible to partition the housing portion (23) of the cowl (20A, 20B) where the compressor blade (12b) is present and a space inside the cowl (20A, 20B) where the thrust blade (12a) is present by the rim (16). As a result, the flow of air generated by the compressor blade (12b) and the flow of air generated by the thrust blade (12a) can be separated.

Further, in the ducted fan (1B) according to an aspect of the disclosure, the cowl (20B) includes a second outlet (29a) configured to allow air flowing through the housing portion (23) to be blown out by the compressor blade (12b), and the second outlet (29a) is provided outwards in the radial direction of the cowl (20B) and near the introduction port (21) of the cowl (20B), and thus blows out air toward a second end portion side of the cowl (20B).

In the ducted fan (1B) according to the present aspect, the cowl (20B) includes the second outlet (29a) configured to allow air flowing through the housing portion (23) to be blown out by the compressor blade (12b), and the second outlet (29a) is provided outwards in the radial direction of the cowl (20A, 20B) and near the introduction port (21) of the cowl (20B), and thus blows out air toward the second end portion side of the cowl (20B), thereby making it possible to generate a flow of air (hereinafter referred to as "second jet flow") along the outer circumferential surface from near the introduction port (21) of the cowl (20B) by the compressor blade (12b). The second jet flow draws the surrounding air by the Coanda effect, thereby making it possible to suppress the separation of air at the outer circumferential surface of the cowl (20B). Further, the flow of air along the outer circumferential surface of the cowl (20B) is increased in speed by the second jet flow, thereby making it possible to reduce the pressure acting as a resistance component.

Further, in the ducted fan (1A, 1B) according to an aspect of the disclosure, the outlet (28a) and the inlet (28b) are formed around an entire circumference of the cowl (20A, 20B).

In the ducted fan (1A, 1B) according to the present aspect, the outlet (28a) and the inlet (28b) are formed around the entire circumference of the cowl (20A, 20B), thereby making it possible to provide the ducted fan (1A, 1B) capable of handling crosswinds from any direction, for example.

Further, in the ducted fan (1A, 1B) according to an aspect of the disclosure, the outlet (28a) and the inlet (28b) are partially formed in a circumferential direction of the cowl (20A, 20B).

In the ducted fan (1A, 1B) according to the present aspect, the outlet (28a) and the inlet (28b) are partially formed in the circumferential direction of the cowl (20A, 20B), thereby making it possible to reduce manufacturing costs compared to when the outlet (28a) and the inlet (28b) are formed around the entire circumference of the cowl (20A, 20B).

Further, in the ducted fan (1A, 1B) according to an aspect of the disclosure, the outlet (28a) and the inlet (28b) are provided only in a portion positioned upwind when the axial line (X) is inclined.

In the ducted fan (1A, 1B) according to the present aspect, the outlet (28a) and the inlet (28b) are provided only in a portion positioned upwind when the axial line (X) is inclined, thereby making it possible to provide the outlet (28a) and the inlet (28b) only in a portion where air readily separates.

Further, in the ducted fan (1A, 1B) according to an aspect of the disclosure, the ducted fan (1A, 1B) is a rim (16) drive type, with the fan (10) including a rotor core provided with a magnet on an outer circumferential side of the compressor blade (12b), and the cowl (20A, 20B) including a stator core provided with a coil in the housing portion (23).

In the ducted fan (1A, 1B) according to the present aspect, the ducted fan (1A, 1B) is a rim (16) drive type, with the fan (10) including a rotor core provided with a magnet on the outer circumferential side of the compressor blade (12b), and the cowl (20A, 20B) including a stator core provided with a coil in the housing portion (23), thereby making it possible to cool the stator core, which is a heat generating component, by the flow of air generated by the compressor blade (12b).

Further, in the ducted fan (1A, 1B) according to an aspect of the disclosure, a shape of the compressor blade (12b) and a shape of the thrust blade (12a) differ.

In the ducted fan (1A, 1B) according to the present aspect, the shape of the compressor blade (12b) and the shape of the thrust blade (12a) differ, thereby making it possible to select the shapes of the blades in accordance with an application. For example, it is possible to make only the compressor blade (12b) have a shape specialized for air compression.

Further, in the ducted fan (1A, 1B) according to an aspect of the disclosure, the number of the compressor blades (12b) and the number of the thrust blades (12a) differ.

In the ducted fan (1A, 1B) according to the present aspect, the number of compressor blades (12b) and the number of thrust blades (12a) differ, thereby making it possible to select the numbers of the blades in accordance with an application.

Further, an aircraft according to an aspect of the disclosure includes the above-described ducted fan (1A, 1B).

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. A ducted fan comprising:
a fan configured to rotate about an axial line to generate a flow of air; and
a cowl having a cylindrical shape extending in an axial line direction and surrounding the fan about the axial line, and including an introduction port configured to introduce air from a first end portion side by rotation of the fan,
the fan including
a compressor blade provided on an outer circumferential side and
a thrust blade provided on an inner circumferential side of the compressor blade,
the cowl including
a housing portion configured to accommodate the compressor blade in an interior thereof,
an outlet configured to allow air flowing through the housing portion to be blown therethrough by the compressor blade, and
an inlet configured to suck air blown out from the outlet,
the outlet being provided inwards in a radial direction of the cowl and near the introduction port of the cowl, and
the inlet being provided inwards in the radial direction of the cowl and between the outlet and the compressor blade in the axial line direction.

2. The ducted fan according to claim 1, wherein
the compressor blade and the thrust blade are connected by a rim that is annular about the axial line and is configured to rotate along with the fan and
the rim forms a portion of a surface of the cowl inwards in the radial direction.

3. The ducted fan according to claim 1, wherein
the cowl includes a second outlet configured to allow air flowing through the housing portion to be blown out by the compressor blade and
the second outlet is provided outwards in the radial direction of the cowl and near the introduction port of the cowl, and thus blows out air toward a second end portion side of the cowl.

4. The ducted fan according to claim 2, wherein
the cowl includes a second outlet configured to allow air flowing through the housing portion to be blown out by the compressor blade and
the second outlet is provided outwards in the radial direction of the cowl and near the introduction port of the cowl, and thus blows out air toward a second end portion side of the cowl.

5. The ducted fan according to claim 1, wherein
the outlet and the inlet are formed around an entire circumference of the cowl.

6. The ducted fan according to claim 2, wherein
the outlet and the inlet are formed around an entire circumference of the cowl.

7. The ducted fan according to claim 3, wherein
the outlet and the inlet are formed around an entire circumference of the cowl.

8. The ducted fan according to claim 4, wherein
the outlet and the inlet are formed around an entire circumference of the cowl.

9. The ducted fan according to claim 1, wherein
the outlet and the inlet are partially formed in a circumferential direction of the cowl.

10. The ducted fan according to claim 9, wherein
the outlet and the inlet are provided only in a portion positioned upwind when the axial line is inclined.

11. The ducted fan according to claim 1, wherein
the ducted fan is a rim drive type, with the fan including a rotor core provided with a magnet on an outer circumferential side of the compressor blade, and the cowl including a stator core provided with a coil in the housing portion.

12. The ducted fan according to claim 2, wherein
the ducted fan is a rim drive type, with the fan including a rotor core provided with a magnet on an outer circumferential side of the compressor blade, and the cowl including a stator core provided with a coil in the housing portion.

13. The ducted fan according to claim 3, wherein
the ducted fan is a rim drive type, with the fan including a rotor core provided with a magnet on an outer circumferential side of the compressor blade, and the cowl including a stator core provided with a coil in the housing portion.

14. The ducted fan according to claim 1, wherein
a shape of the compressor blade and a shape of the thrust blade differ.

15. The ducted fan according to claim 1, wherein
the number of the compressor blades and the number of the thrust blades differ.

16. An aircraft comprising the ducted fan described in claim 1.

* * * * *